US012798823B2

(12) United States Patent
Unterlechner et al.

(10) Patent No.: US 12,798,823 B2
(45) Date of Patent: Nov. 17, 2026

(54) PLASTIC CONTAINER

(71) Applicant: ALPLA Werke Alwin Lehner GmbH & Co. KG, Hard (AT)

(72) Inventors: Oliver Unterlechner, Bregenz (AT); Florian Müller, Hard (AT)

(73) Assignee: ALPLA Werke Alwin Lehner GmbH & Co. KG, Hard (AT)

( * ) Notice: Subject to any disclaimer, the term of this patent is extended or adjusted under 35 U.S.C. 154(b) by 281 days.

(21) Appl. No.: 17/289,354

(22) PCT Filed: Oct. 17, 2019

(86) PCT No.: PCT/EP2019/078223
§ 371 (c)(1),
(2) Date: Apr. 28, 2021

(87) PCT Pub. No.: WO2020/088944
PCT Pub. Date: May 7, 2020

(65) Prior Publication Data

US 2021/0371151 A1 Dec. 2, 2021

(30) Foreign Application Priority Data

Oct. 30, 2018 (CH) .................................... 01324/18

(51) Int. Cl.
*B65D 1/42* (2006.01)
*B33Y 80/00* (2015.01)
*B65D 1/02* (2006.01)

(52) U.S. Cl.
CPC ............ *B65D 1/42* (2013.01); *B65D 1/0223* (2013.01); *B33Y 80/00* (2014.12)

(58) Field of Classification Search
CPC .................... B65D 1/42; B65D 1/0223; B65D 2501/2407; B65D 2501/24127;
(Continued)

(56) References Cited

U.S. PATENT DOCUMENTS 4,637,934 A * 1/1987 White .................... A61J 9/006 426/123
6,112,925 A * 9/2000 Nahill ................. B65D 1/0215 215/381
(Continued)

FOREIGN PATENT DOCUMENTS

CN 103043272 A 4/2013
CN 107 914 393 A 4/2018
(Continued)

OTHER PUBLICATIONS https://web.archive.org/web/20130331012213/https://www.thingiverse.com/thing:65922 (Year: 2013).*
(Continued)

*Primary Examiner* — Robert J Hicks
*Assistant Examiner* — Sanjidul Islam
(74) *Attorney, Agent, or Firm* — Secant IP, P.L.L.C.

(57) ABSTRACT

A plastic container for flowable and pourable filling material. The plastic container has a container body, which is preferably provided with one or more emptying openings (3) and which has container walls (4) and a container bottom (5), and the container walls and the container bottom enclosing a cavity. The container body has at least one support structure (10). The support structure and/or the container body is produced, at least in parts, by way of a 3D printing method.

21 Claims, 4 Drawing Sheets

(58) Field of Classification Search
CPC ........ B65D 25/005; B65D 2519/00512; B65D 1/38; B33Y 80/00
USPC ........ 215/900, 379; 220/485, 668, 672, 670, 220/675, 669
See application file for complete search history.

(56) References Cited

U.S. PATENT DOCUMENTS

| | | | | |
|---|---|---|---|---|
| 6,179,142 | B1 | 1/2001 | Hansen | |
| 10,139,641 | B1 * | 11/2018 | Staton | G02B 30/56 |
| D919,377 | S * | 5/2021 | Seiders | D7/608 |
| 11,104,073 | B2 | 8/2021 | Alonso et al. | |
| 2003/0106895 | A1 | 6/2003 | Kalal | |
| 2007/0045221 | A1 * | 3/2007 | Trude | B65D 1/46 215/382 |
| 2008/0264939 | A1 * | 10/2008 | Bray | B65D 15/04 220/276 |
| 2014/0008254 | A1 | 1/2014 | Weinmeier | |
| 2015/0246272 | A1 | 9/2015 | Weinmeier | |
| 2016/0039581 | A1 * | 2/2016 | Mar | B65D 43/16 215/216 |
| 2016/0272370 | A1 | 9/2016 | Rubinstein | |
| 2019/0162979 | A1 * | 5/2019 | Staton | G09F 19/12 |

FOREIGN PATENT DOCUMENTS

| | | | |
|---|---|---|---|
| CN | 108 602 258 | A | 9/2018 |
| CN | 108484110 | A | 9/2018 |
| CN | 108 883 857 | A | 11/2018 |
| EP | 1 616 801 | A2 | 1/2006 |
| WO | 03/013982 | A1 | 2/2003 |

OTHER PUBLICATIONS

International Search Report Corresponding to PCT/EP2019/078223 mailed Jan. 29, 2020.

Written Opinion Corresponding to PCT/EP2019/078223 mailed Jan. 29, 2020.

Chinese Search Report Corresponding to 201980071493.9 mailed Jul. 13, 2022.

* cited by examiner

PLASTIC CONTAINER

This application is a National Stage filing of PCT/EP2019/078223 filed Oct. 17, 2019, which claims priority from Swiss patent application serial no. 01324/18 filed Oct. 30, 2018.

FIELD OF THE INVENTION

The invention relates to a plastic container for flowable and pourable filling material according to the independent claim(s).

BACKGROUND OF THE INVENTION

Containers of tin sheet or aluminium sheet, of glass or also of ceramic, such having been common in the past, are being increasingly replaced by containers of plastic. In is particularly for the packaging of fluid substances, for example for applications in the household, in agriculture, industry or commerce etc., that it is recently predominantly plastic containers which are applied. The low weight and the lower costs of course play a significant role in such a substitution. The use of recyclable plastic materials and the overall more favourable total energy balance on their manufacture also contribute to encouraging the acceptance of plastic containers by the users.

Plastic containers of polyethylene (PE or also HDPE or LDPE) or of polypropylene and similar materials are mostly manufactured in an extrusion blow moulding method. Hereby, a flexible tube is moulded from the plastic material and this is inflated in a moulding tool and as a result bears upon the contours of the moulding tool. Extrusion blow moulded plastic containers can be recognised by way of the fact that they comprise a seam at least on the base, said seam originating from the squeezing of an open end of the preform. The squeezed ends, so-called slugs need to be removed after the removal from the blow mould part.

Plastic containers of polyethylene terephthalate (PET) and similar materials are mostly manufactured in a so-called stretch blow moulding method. Herein, a preform is firstly manufactured in an injection mould in an injection moulding method. Recently, compression moulding methods or also extrusion blow moulding methods have also been suggested for the manufacture of preforms. The preform has an essentially elongate preform body and is designed in a closed manner at its one longitudinal end. Usually, an injection point which originates from the injection moulding is also to be found there. This can also be recognised later on the completed plastic containers. A neck section which is provided with a pour-out opening connects onto the other end of the preform body. The neck section already has the later shape of the container neck. In the case of a bottle, a shoulder section connects onto the container neck after the final shaping. Concerning many of the known preforms, the preform body and the neck section are separated from one another by way of a so-called support ring. The support ring projects radially away from the neck wall and serves for the transport of the preform or of the plastic container which is manufactured therefrom and for the support of the preform on the blow moulding tool or of the plastic container on closing this.

After its manufacture, the preform is removed from the mould and, still hot, can be immediately processed further in a single-stage stretch blow moulding method. Given a two-stage stretch blow moulding method, the preform is cooled and intermediately stored for a spatially and or temporally separate further processing on a stretch blow moulding device. The preform is then conditioned where necessary before the further processing in a stretch blow moulding device, i.e. a temperature profile is imparted upon the preform. It is subsequently brought into a blow mould of a stretch blow moulding device. In the blow mould, the preform is finally inflated according to the mould cavity by way of a gas, usually air, which is blown in at overpressure, and is herein additionally stretched by a stretching mandrel.

An injection blow moulding method, concerning which the stretch blowing process is effected directly subsequently to the injection of the preform, is also already known. Herein, the preform remains on the injection core which at the same time forms a type of stretching mandrel. Again, by way of overpressure, the preform is inflated according to the mould cavity of a blow mould which is moved towards the injection core or vice versa and herein is stretched by the stretching mandrel. The finished plastic container is subsequently removed from the mould. Stretch blow moulded or injection blow moulded plastic containers can be identified by way of the injection point which is usually arranged in the region of the container base, originates from the preform and in which the plastic material has only been slightly stretched or even not at all.

The most varied of 3D printing methods for manufacturing objects of plastic, ceramic or metal are known. In the meanwhile, carbon and graphite materials and material mixtures as well as paper and other plant-fibre-based materials can be processed in 3D-printing. What is characteristic of these 3D printing methods is the fact that the material is deposited layer for layer and is shaped into a three-dimensional object.

These methods are therefore also denoted as additive manufacturing methods. The layer-wise construction is effected in a computer-controlled manner from one or more fluid or solid materials according to predefined dimensions and shapes, wherein solid materials are brought into the process for example in the form of powder or wires. Concerning the layered construction, physical and/or chemical melting and curing process take place. For the purpose of this application, all additive manufacturing methods such as in particular selective laser melting, electron beam melting, selective laser sintering, stereolithography, digital light processing and polyjet modelling as well as fused deposition modelling are to be understood as 3D printing methods.

For economical or ecological reasons, on manufacture of plastic containers one seeks to use as little as possible plastic material. This is implemented in a manner such that the wall thicknesses of the plastic containers are reduced. For reasons of the demanded intrinsic stiffness, the mechanical stability, for example for passing drop tests and further mechanical loading, and of the inner pressure resistance of the plastic containers, for example for storing carbonated drinks, limits are placed on the reduction of the wall thickness of the plastic containers.

SUMMARY OF THE INVENTION

It is therefore the object of the present invention to provide a plastic container which permits the used quantity of plastic material to be reduced even further. Herein, the plastic container is to be suitable for mass technological manufacture.

The solution of this and yet further objects lies in a plastic container for flowable and pourable filling material, which comprises the features which are specified in patent claim 1.

Further developments and/or advantageous embodiment variants of the invention are the subject-matter of the dependent patent claims.

By way of the invention, a plastic container in particular for flowable and pourable filling material is created, said container comprising a container body which is provided with an emptying opening or several emptying openings and which comprises container walls and a container base which encompass a cavity. The plastic container is designed essentially as a bottle. The emptying opening is formed from a shoulder region, a neck region which connects thereto as well as a pour-out opening which connects to this. The container body comprises at least one support structure. The support structure and/or the container body are manufactured at least in regions in a 3D printing method.

In particular, the emptying opening, in other words the structure elements—the shoulder region, the neck region and the pour-out opening—are manufactured together with the container body and/or the support structure in a 3D printing method.

By way of the container body comprising at least one support structure, a minimum wall thickness of the container body which is known at the point in time of the application can be reduced even further. The support structure assists in the intrinsic stiffness of the container body. By way of the support structure, the storage and barrier function of the container body and the support function are decoupled from one another. The barrier function as was hitherto the case is assumed by the container walls which encompass the cavity and by the container body. In contrast, the support function is assumed by the support structure. This permits the container walls and/or the container base to be reduced in their minimum wall thicknesses. The minimum wall thickness is now merely limited by the barrier function of the material and of the application. Plastic material can be saved by way of this, which is advantageous from an ecological and economical point of view, without compromising the functionality and the mechanical loadability of the plastic container.

The support structure and/or the container body can be manufactured at least in regions in a 3D printing method. The 3D printing method permits the manufacture of 3-dimensional objects directly from the electronic data which reproduce the spatial coordinates of the object. Herein, one can do away with the manufacture of a special mould with a mould cavity, as is necessary for example for an injection moulding method. Herein, the 3D printing method also permits more degrees of freedom than is possible for example on injection moulding an object, concerning which indeed it is always the ability of the manufactured object to be removed from the mould which must be considered.

A 3D printing method in particular is characterised in that containers which are manufactured by way of this method or regions of containers which are manufactured by this method do not have any visible seams or injection points.

The support structure can be arranged on at least an outer wall of the container body and/or on at least an inner wall of the container body and/or on the container base and/or within the cavity which is encompassed by the container walls. In an alternative embodiment of the invention, the support structure can be embedded into at least one of the container walls and/or into the container base. Concerning further embodiments of the invention, arrangements of support structures and the embedding of support structures can be combined with one another. Concerning all embodiments, the container walls and the container base primarily fulfil the barrier function, whilst the carrying function is ensured by the support structures. The design of the container body in accordance with the invention with support structures also permits additional functions, which are yet explained hereinafter.

The support structure can consist of plastic and/or metal and/or ceramic and/or carbon structures or graphite structures and similar materials or material mixtures or of paper or other plant-fibre-based materials. Restrictions merely exist where the support structure comes into direct contact with the filling material. In these cases, the material of the support structure must be suitable and permitted for example for foodstuffs and/or be inert with respect to the filling material.

Concerning a further embodiment of the invention, the support structure is arranged within the cavity which is encompassed by the container walls. Herein, the support structure extends over essentially the entire axial length of the container body. Concerning this embodiment, the container walls to the outside only form an envelope of the support structure. The wall thickness of this envelope is sufficiently large, in order to fulfil the barrier demands. The actual carrying function and the mechanical stability of the container body are fulfilled by the support structure.

The support structure can be composed for example of one or more basic structure elements which are designed essentially in the same manner and are connected to one another. On manufacturing the support structure in a 3D printing method, there are hardly any restrictions whatsoever with regard to the design and shape of the basic structure elements. The basic structure elements can then be connected to one another for example by way of welding, e.g. laser welding. It is likewise possible to connect different basic structure elements to one another in a direct manner during their manufacture or manufacture these together in a simple manufacturing method.

In a further embodiment of the invention, the basic structure elements have a diameter of at least 0.05 mm to 1 mm. Despite the small diameter of the basic structure elements, the support structure which is joined together from these has an adequately large strength.

A further embodiment of the invention can envisage the support structure extending over a large part of the cavity which is encompassed by the delimitation walls. Although a part of the cavity is lost by the support structure, the plastic container which is designed in such a manner however has a particularly high mechanical strength.

By way of the support structure in a further embodiment of the plastic container, for example of a plastic bottle, having a framework-like construction, the volume which is lost by the support structure can be kept small. Support structures which are constructed in a framework-like manner furthermore have a high intrinsic stiffness and a high crush strength.

In a further variant of the plastic container, the support structure can be constructed in a three-dimensional manner or be designed in an elastically deformable manner in one or more dimensions. The elastic design of the support structure permits for example the flowable or pourable filling material to be brought out by way of pressing together two container walls which lie opposite one another along the specified dimension.

The specified dimension of the support structure usually corresponds to a depth of the container body. In both other dimensions, the supports structure is designed in a rigid manner, in order to ensure the crush strength and width strength of the plastic container. However, it is to be understood that the plastic container can also be designed in a flexible manner in its width instead of in its depth.

In a further embodiment of the plastic container according to the invention, the support structure is arranged on at least one of the container walls or is embedded into at least one of the container walls. Concerning this embodiment of the invention, the support structure forms a type of frame for the respective container wall. The container wall itself then merely needs to be designed as thickly as is necessary for fulfilling the barrier function. The mechanical strength of the container wall is set by the support structure.

In a further embodiment of the invention, the support structure is designed as a frame structure which extends at least regionally over an axial longitudinal extension and/or a peripheral extension of the container wall. The container wall can for example be joined into this frame structure in a manner such that the frame structure remains visible. In an alternative embodiment, the frame structure can be covered by the container wall.

The support structure can be designed as a contour-providing structure and define the contour of the at least one container wall. The individual container walls can then for example be assembled together into the plastic container. As a rule however, the support structures of the individual container walls are fastened to one another, in order to define the contour of the container body. In a further embodiment of the invention, the support structure is manufactured in a 3D printing method in a manner such that it already defines the entire contour of the container body. The container walls of the container body are then joined onto the support structure at the inside or outside.

In a further embodiment of the plastic container, the support structure is arranged between an outer wall and an inner wall of the container body. Concerning this variant, the support structure is embedded into the container walls. Assembled in such a manner, the support structure does not come into contact with the flowable or pourable filling material. This increases the degrees of freedom with regard to the materials which can be used.

The support structure can be designed in a manner such that it can be unraveled into a plane surface. The support structure can also be manufactured of a flat tape material. The shaping of the support structure can herein be effected by way of punching, mechanical cutting, laser cutting or similar machining methods. On manufacture of the support structure in a 3D printing method, this can be manufactured in plane layers. Herein, the layers can be aligned parallel to a longitudinal axis of the plastic container.

A further embodiment of the plastic container according to the invention can envisage the support structure being designed as a bistable construction. A first bistable position of the support structure is the folded together state. In the folded-together state, the support structure can then be inserted into a sheath which forms a delimitation wall or delimitation walls for the container body. When required, for example in order to fill the plastic container, the support structure can then be unfolded again. Such a version of the plastic container has been found to be particularly advantageous for the transport in the empty state.

Concerning another embodiment variant of the plastic container, the support structure which is constructed of basic structure elements can be designed as an interlaced structure which can be brought into its final shape by way of mechanically adjusting one of the basic structure elements. This embodiment variant of the plastic container can also be folded together and unfolded again when required.

The basic structure elements, from which the foldable support structure is put together, have a diameter which does not fall short of 0.05 mm. Despite these low dimensions, support structures which have the necessary mechanical strengths can be put together from the basic structure elements.

Concerning a further embodiment variant of the invention, the support structure is arranged on the container base and/or is embedded into the container base. By way of this, the support function and the barrier function are also separated from one another in the container base, and the container base can also be designed with a significantly lower wall thickness.

Different further variants of the plastic container according to the invention are characterised by a combination of support structures which are arranged at least on an outer wall of the container body and/or at least on an inner wall of the container body and/or on the container base and/or within the cavity which is encompassed by the container walls or embedded into at least one of the container walls and/or into the container base. This variant can be designed in a foldable or controllably collapsible manner. Herein, the support structure and/or the container walls and/or the container base can be manufactured at least in regions in a 3D printing method.

In an alternative embodiment of the invention, the container body can be manufactured for example in a blow moulding method. Such a manufacturing method herein represents the extrusion blow moulding, concerning which an extruded plastic flexible tube is inflated into a contour-providing support structure which was previously brought into the blow mould. Herein, the support structure can be manufactured at least in regions in a 3D printing method.

A container wall which is provided with a support structure has a wall thickness of 0.1 mm to 0.5 mm, preferably 0.15 mm to 0.3 mm, wherein the wall thickness is measured without the support structure. In the regions, in which the support structure and the container walls overlap, the wall thickness is at least 0.25 mm.

The plastic container according to the invention with support structures comprises a container body which to more than 50% consists of thermoplastic plastics, in particular PET, PP, HDPE or LDPE or other bio-based thermoplastic plastics such as for example PEF. The plastics which can be used herein of course also depend on the method which is applied for manufacturing the plastic container.

The plastic container can comprise a container body with a circular or a flat-oval or a polygonal cross section. The plastic container can also comprise an integrated handle. In an alternative embodiment, the handle can of course also be assembled on the container body at a later stage. For this, the support structure can already be provided with assembly points for the handle.

BRIEF DESCRIPTION OF THE DRAWINGS

Further advantages and features result from the subsequent description of embodiment examples of the invention with reference to the schematic drawings. In a representation which is not true to scale are shown.

DETAILED DESCRIPTION OF THE PREFERRED EMBODIMENTS

Figure 1:
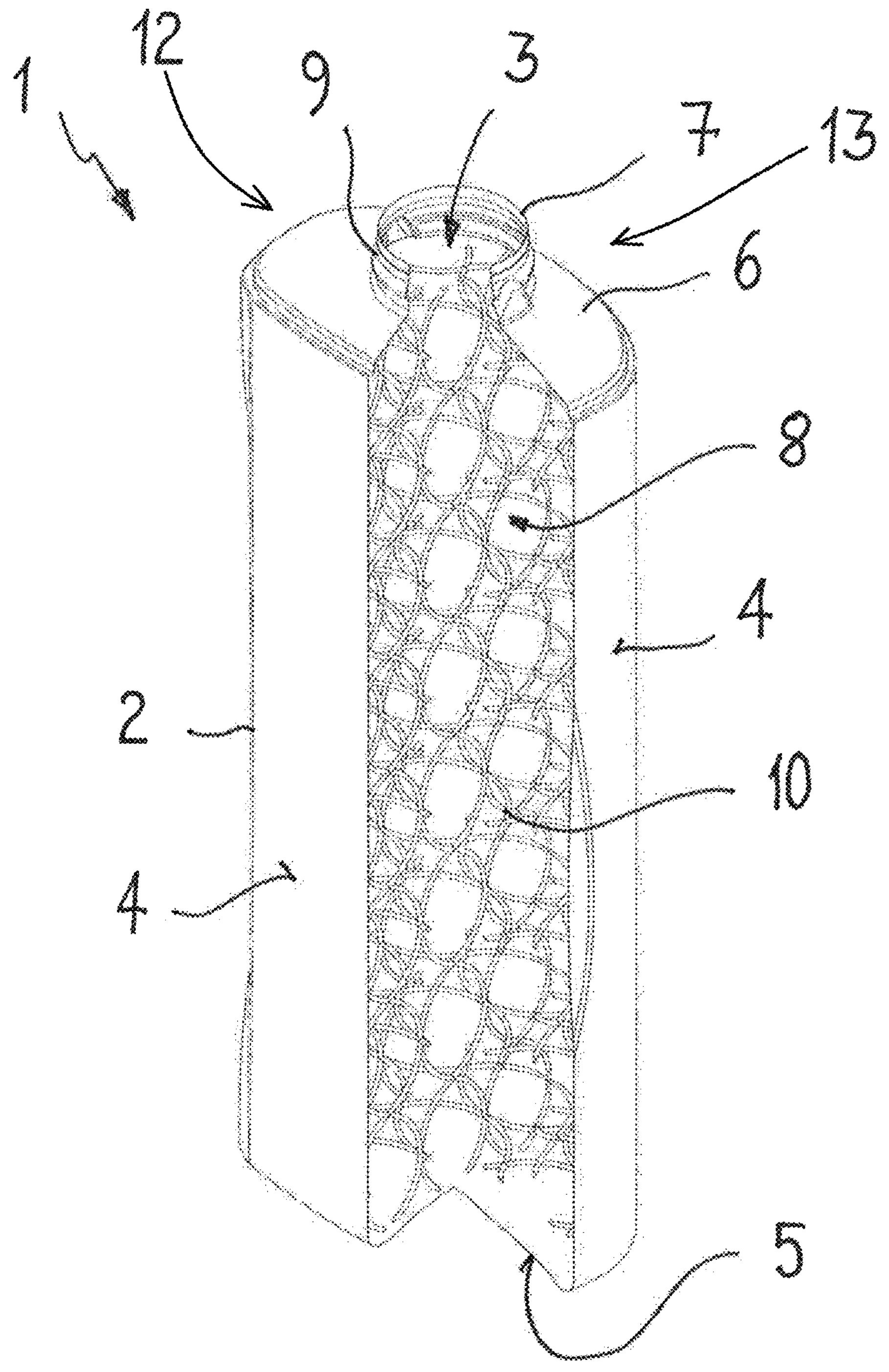
FIG. 1 a partly longitudinally sectioned perspective view of a plastic container.

A plastic container which is represented in a partially sectioned view in FIG. 1 in its entirety has the reference numeral 1. The plastic container 1 comprises a container body 2 which is provided with an emptying opening 12. The container body 2 comprises container walls 4 and a container base 5 which encompass a cavity 8. The container body 2 consists for example predominantly, i.e. to 90% or more of HDPE or LDPE. The container base 5 at the same time forms a placement surface for the plastic container 1 in the represented embodiment example. The container body 2, as is represented, at its longitudinal end which is opposite to the container base 5 can comprise an essentially flat container shoulder 6 which defines a shoulder region. Subsequent to the container shoulder 6, a neck region 13 extends in the direction of a pour-out opening 3 which is designed as a pour-out spout 7. This pour-out spout 7 edges a pour-out opening 3. The emptying opening 12 is formed from the shoulder region 6, the neck region 13 and the pour-out opening 3. This configuration corresponds to the typical configuration of a bottle. In alternative embodiments of the plastic container, the container walls can also run out directly into the pour-out spout 7 with the pour-out opening 3. First engagement elements 9 in the form of threaded sections, thread flights or the like can be arranged on the outer wall of the pour-out spout and these positively interact with corresponding second engagement element on the inner wall of a closure (not represented). Alternatively, the first engagement means can also be arranged on the inner wall of the pour-out spout. In this case, the associated closure comprises corresponding engagement means on an outer wall of the closure. The outer or inner wall of the pour-out spout can for example also be designed in an unstructured or smooth manner and be designed for the frictional fixation of a closure plug.

As is evident from the drawing in FIG. 1, a support structure 10 is arranged within the cavity 8 which is encompassed by the container walls 4 and the container base 5. The support structure 10 extends essentially over the entire height of the container body 2 and provides this with the necessary mechanical stiffness and strength. The container walls 4 themselves do not need to accommodate mechanical forces. The barrier function of the container body 2 and the support function can be decoupled form one another by way of the support structure. 10. The barrier function is assumed by the container walls 4 which encompass the cavity 8 and by the container base 5. These can be optimised with regard to this function. In contrast, the support function is assumed by the support structure 10. This permits the container walls and/or the container base to be reduced in their wall thickness. The wall thickness of the container walls 4 or of the container base can be for example only 0.1 mm to 0.5 mm, preferably 0.15 mm to 0.3 mm.

Figure 2:
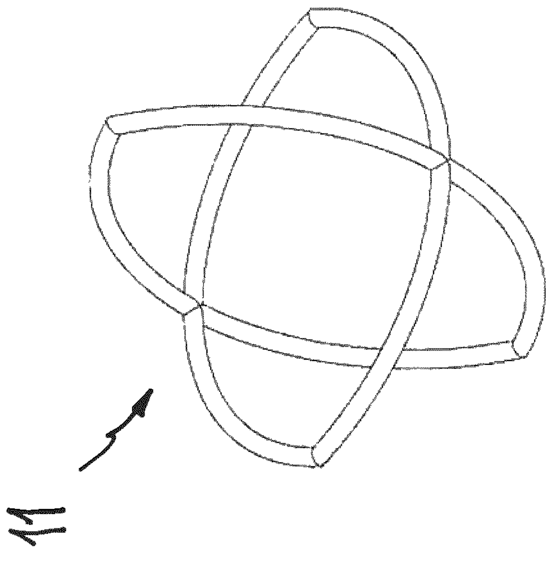
FIG. 2 a perspective view of a basic structure element.

The support structure 10 is constructed of a number of basic structure elements 11. One example of such a basic structure element 11 is represented in FIG. 2. The basic structure element 11 is designed in a spatial manner and roughly has the shape of two ellipses of the same type which are connected to one another and whose longitudinal axes are aligned roughly perpendicularly to one another. The basic structure element 11 by way of example is manufactured in a 3D printing method. The basic structure element 11 has a diameter which does not fall short of 0.05 mm.

Figure 3:
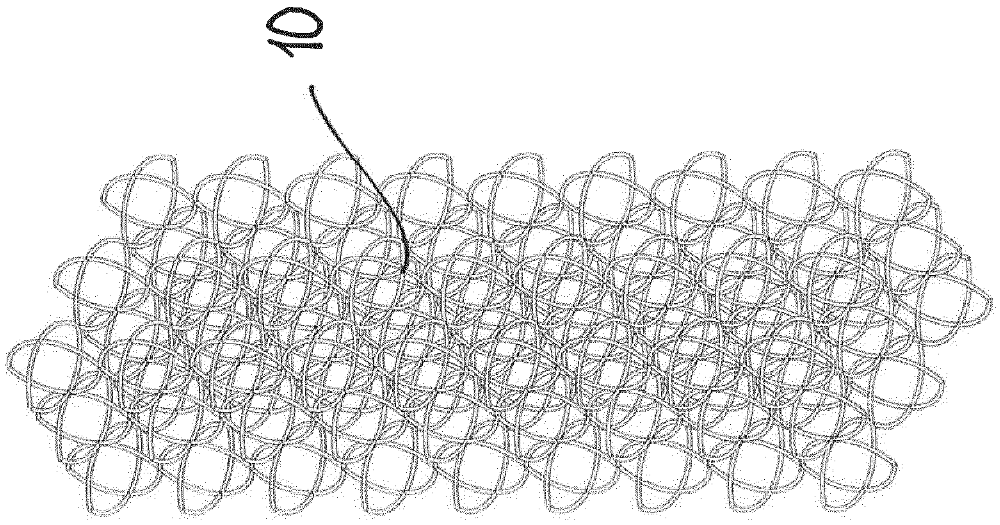
FIG. 3 a support structure which is put together from basic structure elements according to FIG. 2.

Several basic structure elements 11 are connected to one another and thus form the support structure 10 which is represented in FIG. 3. The basic structure elements 11 are herein designed in essentially the same manner and are connected to one another. On manufacture of the support structure in a 3D printing method there are hardly any restrictions with regard to the design and shaping of the basic structure elements. The basic structure elements can then be connected to one another for example by way of welding, e.g. laser welding.

Figure 4:
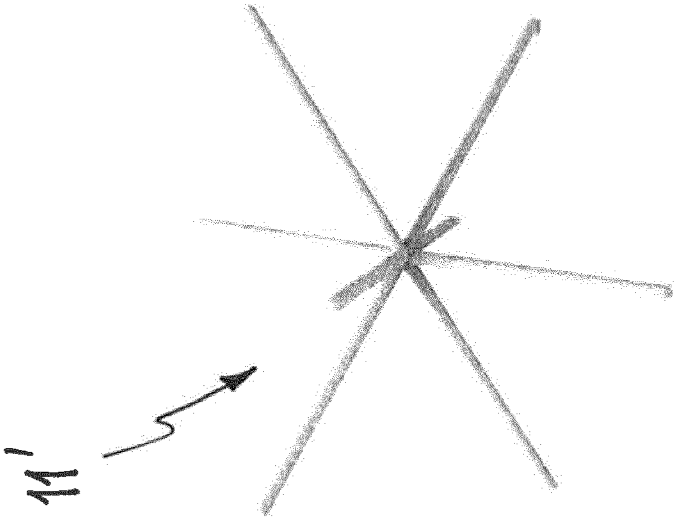
FIG. 4 an alternative variant of a basic structure element.

FIG. 4 shows an alternative embodiment of a spatially designed basic structure element which is provided with the reference numeral 11'. The basic structure element 11' has the shape of four rods which are spatially inclined to one another at the same angle. The individual rods have a diameter which is at least 0.05 mm. The manufacture of the basic structure elements 11' is again effected for example in a 3D printing method.

The basic structure elements 11, 11' consist of plastic and/or of metal and/or of ceramic and/or of carbon or graphite and similar materials or material mixtures or of paper or other plant-fibre-based materials. Restrictions with respect to the materials for the basic structure elements 11, 11' only exist where the support structure comes into direct contact with the flowable or pourable filling material. In these cases, the material of the support structure must be suitable and permitted for example for foodstuffs and/or must be inert with respect to the filling material.

Figure 5:
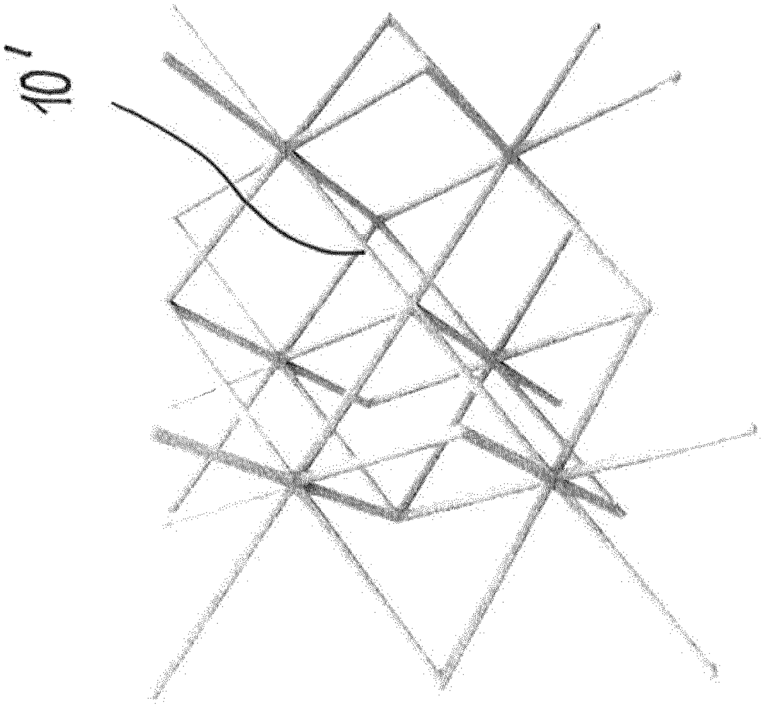
FIG. 5 a support structure which is put together from basic structure elements according to FIG. 4.

The basic structure elements 11' can be joined together into a larger support structure 10' which is represented for example in FIG. 5. The support structures 10, 10' which are represented in FIG. 3 and FIG. 5 comprise a framework-like construction. By way of this, the volume which is lost by the support structure 10, 10' which is arranged in the cavity can be kept small. Support structures 10, 10' which are constructed in a framework-like manner further have a high intrinsic stiffness and a high crush strength.

The support structure 10, 10' which is constructed in a three-dimensional manner can be designed in an elastically deformable manner in at least one dimension. The elasticity of the support structure 10, 10' in at least one dimension can for example simplify a bringing-out of the flowable or pourable filed material by way of pressing together two container walls which lie opposite one another along the specified dimension.

In an embodiment of the invention which is not represented in more detail, the support structure can be flat. The support structure can herein be designed in a manner such that it can be unravelled into a plane surface. The support structure can also be manufactured of a flat tape material. The shaping of the support structure can herein be effected by way of punching, mechanical cutting, laser cutting or similar machining methods. On manufacturing the support structure in a 3D printing method, this can be manufactured in plane layers. Herein, the layers can be aligned parallel to a longitudinal axis of the plastic container.

The structure which is designed in an extensive manner can be arranged on at least one of the container walls or on the container base or be embedded into at least one of the container walls or into the container base. Concerning this embodiment of the invention, the support structure forms a type of frame for the respective container wall or for the container base. The container wall or the container base itself merely needs to be designed as thickly as is necessary for the fulfilment of the barrier function. The mechanical strength of the container wall or of the container base is set by the support structure. In the regions, in which the support structure and the container walls overlap, the wall thickness is at least 0.25 mm.

The extensively designed support structure can be designed as a frame structure which at least in regions extends over an axial longitudinal extension and/or a peripheral extension of the container wall. The container wall can for example be joined into this frame structure in a manner such that the frame structure remains visible. In an alternative embodiment, the frame structure can be covered by the container wall. The support structure can be designed as a contour-providing structure and define the contour of the at least one container wall. The individual container walls can then be assembled together, for example into the plastic container. As a rule however, the support structure of the individual container walls are fastened to one another, in order to set the contour of the container body. Concerning a further embodiment of the plastic container, the support structure can be arranged between an outer wall and an inner wall of the container body. Concerning this variant, the support structure is embedded into the container walls. Assembled in such a manner, the support container does not come into contact with the flowable or pourable filed material. This increases the degrees of freedom with regard to the materials which can be used for the support structure.

Figure 7:
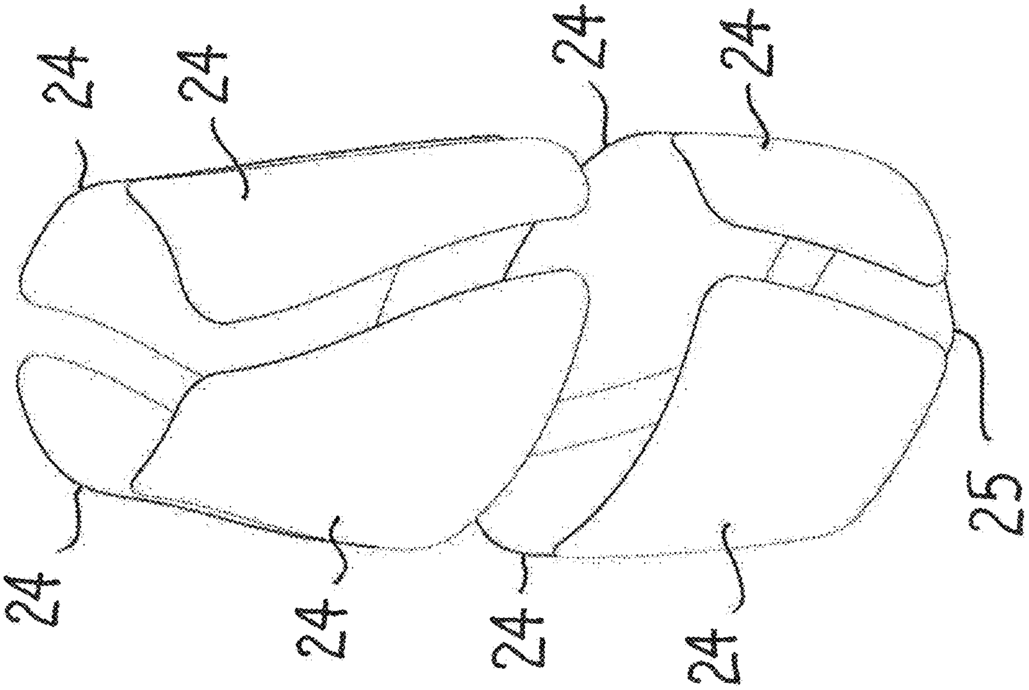
FIG. 7 container walls and a container base for a support structure according to FIG. 6.
Figure 6:
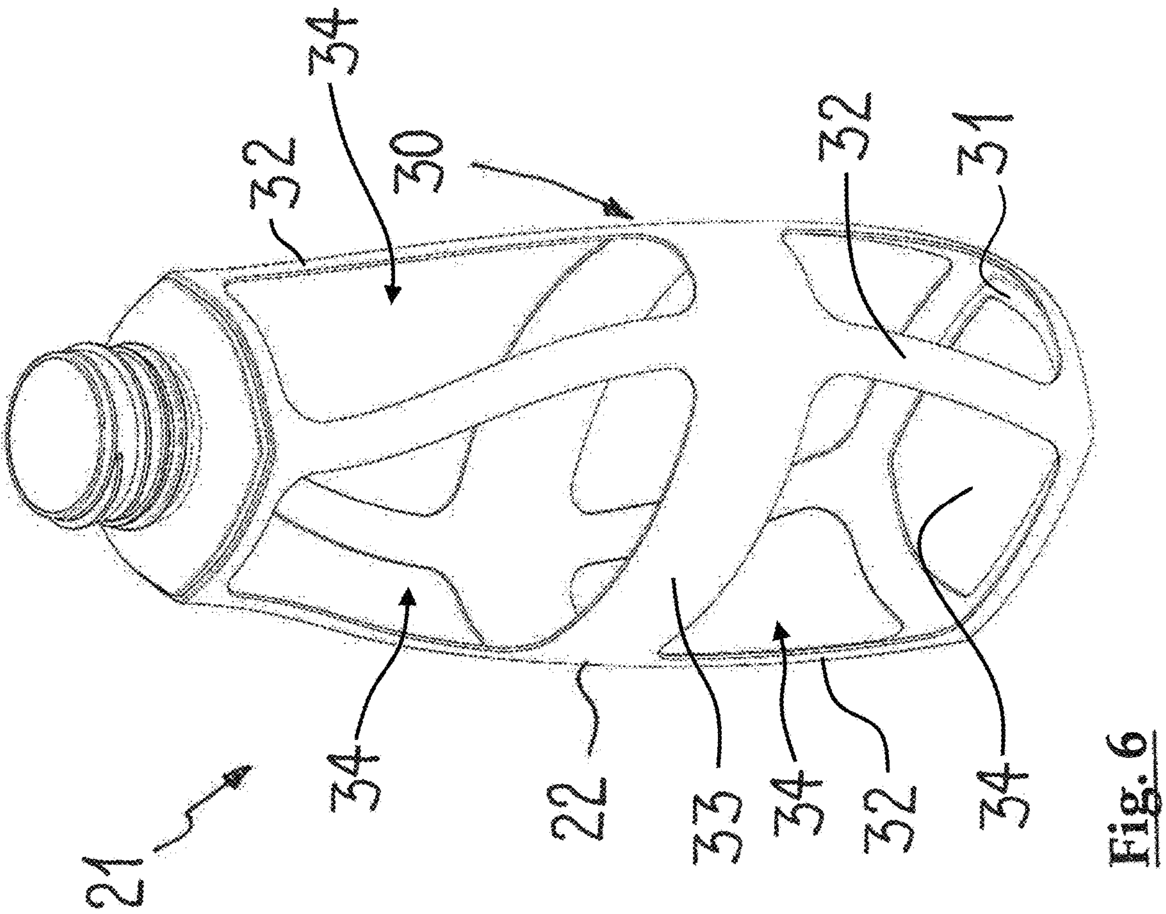
FIG. 6 a support structure of one variant of a plastic container.

FIGS. 6 and FIG. 7 show a further embodiment of a plastic container 21 which comprises a container body 22 with a flat support structure 30 (FIG. 6) which already defines the complete contour of the container body 22 and which has a base 31, plurality of longitudinal strips 32 and a peripheral strip 33. The base 31, longitudinal strips 32 and peripheral strip 33 are arrayed to form openings 34 in the support structure 30. The container walls 24 and the container base 25 of the container body 22 (FIG. 7) are then joined onto the support structure 30 and base 31 thereof, respectfully, at the inside or at the outside. The support structure 30 can be manufactured of a flat tape material. The shaping of the support structure 30 can herein be effected by way of punching, mechanical cutting, laser cutting or similar machining methods. The support structure 30 can also be manufactured in a 3D printing method. The container walls 24 and the container base 25 can be manufactured of a flat tape material or be manufactured in a 3D printing method. In any case, either the support structure 30 or the container walls 24 or the container base 25 or all components of the plastic container 21 are at least regionally manufactured in a 3D printing method. Herein, the container body consists predominantly, i.e. to 90% or more of HDPE or LDPE.

The plastic container according to the invention can comprise a container body with a circular or flat-oval or a polygonal cross section. The plastic container can also comprise a handle. The handle can already be integrated into the container body or not be assembled on the container body until at a later stage. For this, the support structure can already be provided with assembly points for the handle.

The invention has been described with the example of specific embodiment examples. The aforementioned description however merely serves for the explanation of the invention and is not to be considered as limiting. In contrast, the invention is defined by the patent claims and the equivalents which are derived by the person skilled in the art and encompassed by the general inventive concept.

The invention claimed is:

1. A plastic bottle for flowable and pourable filling material, the plastic bottle comprises a container base, a container body with container walls, and a shoulder, wherein the container body terminates in an upper end onto which the shoulder adjoins, and a pour-out opening is arranged on the shoulder so that the shoulder provides a continuous, circumferential surface, the pour-out opening is designed as a pour-out spout comprising a cylindrical neck region with an outer wall, wherein the outer wall comprises engagement elements in the form of threaded sections, and the container body further comprises at least one support structure, the support structure being designed as a flat support structure with a flat laterally outer face which defines the entire outer shape of the container body, and the support structure and the pour-out spout are manufactured as a unitary element in a 3D printing method or the container body and the pour-out spout are manufactured as a unitary element in a 3D printing method or the support structure and the container body and the pour-out spout are manufactured as a unitary element in a 3D printing method.

2. The plastic bottle according to claim 1, wherein the support structure is arranged on at least one of an outer wall of the container body, on at least an inner wall of the container body, on the container base or within a cavity which is encompassed by the container base, the container body and the shoulder are embedded into at least one of the container walls and/or into the container base.

3. The plastic bottle according to claim 1, wherein the support structure comprises one of plastic, metal, ceramic, carbon structures, graphite structures, similar materials or material mixtures, paper or other plant-fibre-based materials.

4. The plastic bottle according to claim 1, wherein the support structure is arranged on at least one of the container walls or is embedded into at least one of the container walls, and the support structure extends around a periphery of the container centrally between the upper end of the container body and the container base.

5. The plastic bottle according to claim 4, wherein the support structure is designed as a frame structure having a plurality of first regions and a second region, the plurality of first regions extend longitudinally from the upper end of the container body to the container base, the second region extends circumferentially around the container body centrally between the upper end of the container body and the container base and the plurality of first regions are spaced from each other circumferentially around the container body.

6. The plastic bottle according to claim 4, wherein the support structure is designed as a contour-providing structure, and the contour-providing structure defines a contour of the at least one container wall.

7. The plastic bottle according to claim 4, wherein the support structure is designed as a contour-providing structure of the container body, the support structure has a base and an outer periphery of a base wall is fixed to the base of the support structure to form the container base.

8. The plastic bottle according to claim 4, wherein the support structure is manufactured in layers by a 3D printing method, and the layers are aligned parallel to one another and to a longitudinal axis of the plastic container.

9. The plastic bottle according to claim 1, wherein the support structure has a base and an outer periphery of a base wall is fixed to the base of the support structure to form the container base.

10. The plastic bottle according to claim 4, wherein the support structure is designed as a framework.

11. The plastic bottle according to claim 1, wherein the container body comprises more than 50% thermoplastic plastics, PET, PP, HDPE, LDPE, other bio-based thermoplastic plastics, or PEF.

12. The plastic bottle according to claim 1, wherein the container body has a circular, a flat-oval or a polygonal cross section.

13. The plastic bottle according to claim 1, wherein the container body comprises an integrated handle.

14. The plastic bottle according to claim 4, wherein the support structure is designed as a frame structure having a plurality of first regions and a second region, the plurality of first regions extend longitudinally from the upper end of the container body to the container base, and the second region extends over a circumference of the container wall at an axial location centrally between the upper-axial end of the container body and the container base.

15. The plastic bottle according to claim 1, wherein the support structure of the container body has an upper end and the support structure has a peripheral strip and a plurality of longitudinal strips having upper and lower axial ends, the longitudinal strips are separated from each other around a circumference of the support structure and the upper axial ends of the longitudinal strips are connected to the shoulder and the lower axial ends of the longitudinal strips are connected to the container base, the peripheral strip merges with the plurality of longitudinal strips centrally between the shoulder and the container base and together with the shoulder and the container base form a plurality of further openings in the support structure, wherein the container walls are independent of each other and the container walls each have a periphery that is connected to the peripheral strip, two of the longitudinal strips and either the shoulder or the container base and enclose the plurality of further openings in the support structure such that the support structure is at least partially uncovered by the container walls.

16. The plastic bottle according to claim 1, wherein the shoulder comprises a shoulder section which is flat or tapers radially inward in direction of the neck region.

17. The plastic bottle according to claim 16, wherein the neck region extends in the direction of the pour-out opening.

18. The plastic bottle according to claim 15, wherein connections formed between the upper ends of the longitudinal strips and the shoulder are spaced apart from each other around a periphery of the emptying opening, and the shoulder tapers radially inward from the upper ends of the longitudinal strips to the neck region and the neck region extends axially from the shoulder to the pour-out opening.

19. The plastic bottle according to claim 1, wherein the neck region has a diameter that is less than a half of a diameter of the upper end of the container body.

20. The plastic bottle according to claim 1, wherein the pour-out opening is centrally arranged on the shoulder.

21. The plastic bottle according to claim 1, wherein the engagement elements are arranged on the outer wall of the neck region.

* * * * *